(12) United States Patent
Uchimura et al.

(10) Patent No.: US 12,217,451 B2
(45) Date of Patent: Feb. 4, 2025

(54) TARGET OBJECT DETECTION APPARATUS, TARGET OBJECT DETECTION METHOD, AND NON-TRANSITORY COMPUTER-READABLE STORAGE MEDIUM

(71) Applicant: NEC Corporation, Tokyo (JP)

(72) Inventors: Jun Uchimura, Tokyo (JP); Yuji Tahara, Tokyo (JP); Rina Tomita, Tokyo (JP); Yasuyo Kazo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 315 days.

(21) Appl. No.: 17/770,364

(22) PCT Filed: Oct. 29, 2020

(86) PCT No.: PCT/JP2020/040594
§ 371 (c)(1),
(2) Date: Apr. 20, 2022

(87) PCT Pub. No.: WO2021/090755
PCT Pub. Date: May 14, 2021

(65) Prior Publication Data
US 2022/0391826 A1 Dec. 8, 2022

(30) Foreign Application Priority Data
Nov. 5, 2019 (JP) .............................. 2019-2000868

(51) Int. Cl.
*G06Q 10/087* (2023.01)
*G06T 7/62* (2017.01)
*G06T 7/70* (2017.01)

(52) U.S. Cl.
CPC ............. *G06T 7/70* (2017.01); *G06Q 10/087* (2013.01); *G06T 7/62* (2017.01); *G06T 2207/30232* (2013.01)

(58) Field of Classification Search
CPC .......... G06Q 10/087; G06T 7/62; G06T 7/70; G06T 2207/30232
(Continued)

(56) References Cited

U.S. PATENT DOCUMENTS

2008/0174432 A1  7/2008  Ulrich
2017/0193430 A1*  7/2017  Barreira Avegliano .....................
                                                      B64U 10/14
(Continued)

FOREIGN PATENT DOCUMENTS

JP      07110889 A   *  4/1995
JP      H07-110889 A    4/1995
(Continued)

OTHER PUBLICATIONS

International Search Report for PCT Application No. PCT/JP2020/040594, mailed on Jan. 19, 2021.
(Continued)

*Primary Examiner* — Ariel J Yu
*Assistant Examiner* — Denisse Y Ortiz Roman

(57) ABSTRACT

A management apparatus (100) includes: an area computation unit (102) that acquires an area of a displayable region of a display shelf in which a product can be displayed, and computes an area ratio of an area of a non-display region of the display shelf in which the product detected from a captured image is not displayed to the area of the display shelf; a decision unit (104) that decides whether to make a notification according to the area ratio; and a notification unit (106) that makes the notification when it is decided that the notification is to be made.

14 Claims, 19 Drawing Sheets

(58) Field of Classification Search
USPC .......................................................... 705/28
See application file for complete search history.

(56) References Cited

U.S. PATENT DOCUMENTS

2017/0337508 A1    11/2017  Bogolea et al.
2019/0215424 A1*   7/2019   Adato ....................... G06T 7/55

FOREIGN PATENT DOCUMENTS

| JP | 2010-517148 A  | 5/2010 |
| JP | 2016-058105 A  | 4/2016 |
| JP | 2019-523925 A  | 8/2019 |
| JP | 2019-152934 A  | 9/2019 |
| WO | 2017/163532 A1 | 9/2017 |

OTHER PUBLICATIONS

JP Office Action for JP Application No. 2021-554915, mailed on Aug. 20, 2024 with English Translation.

* cited by examiner

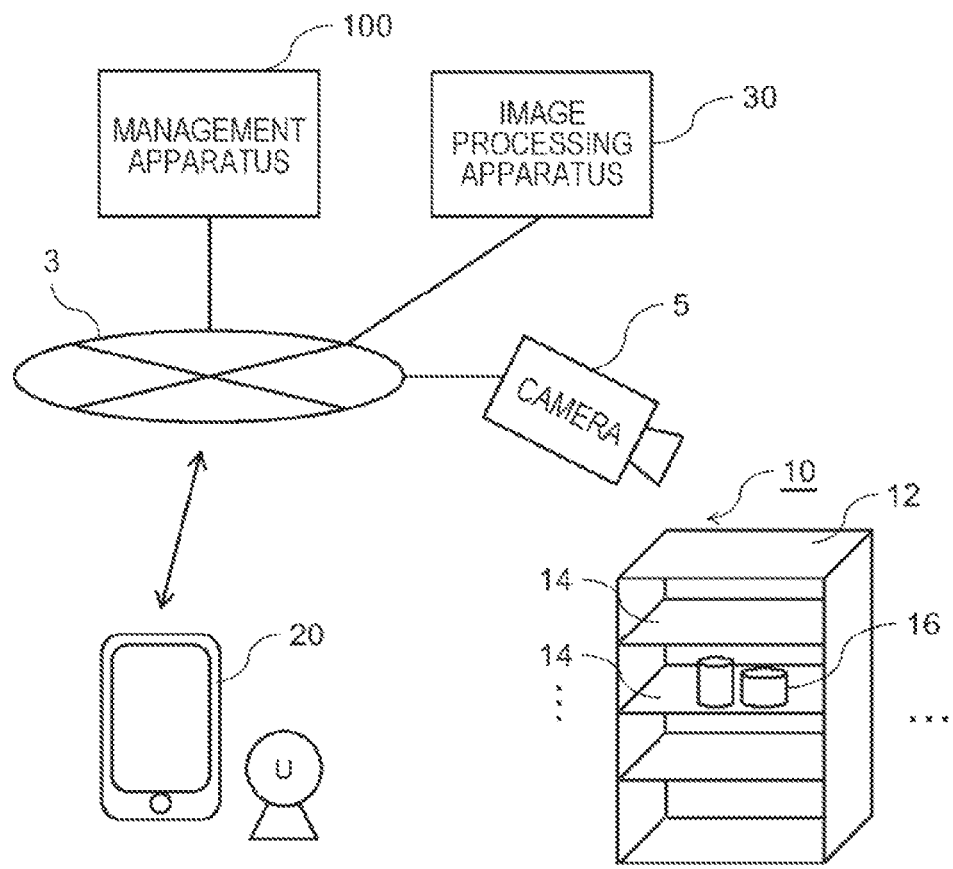

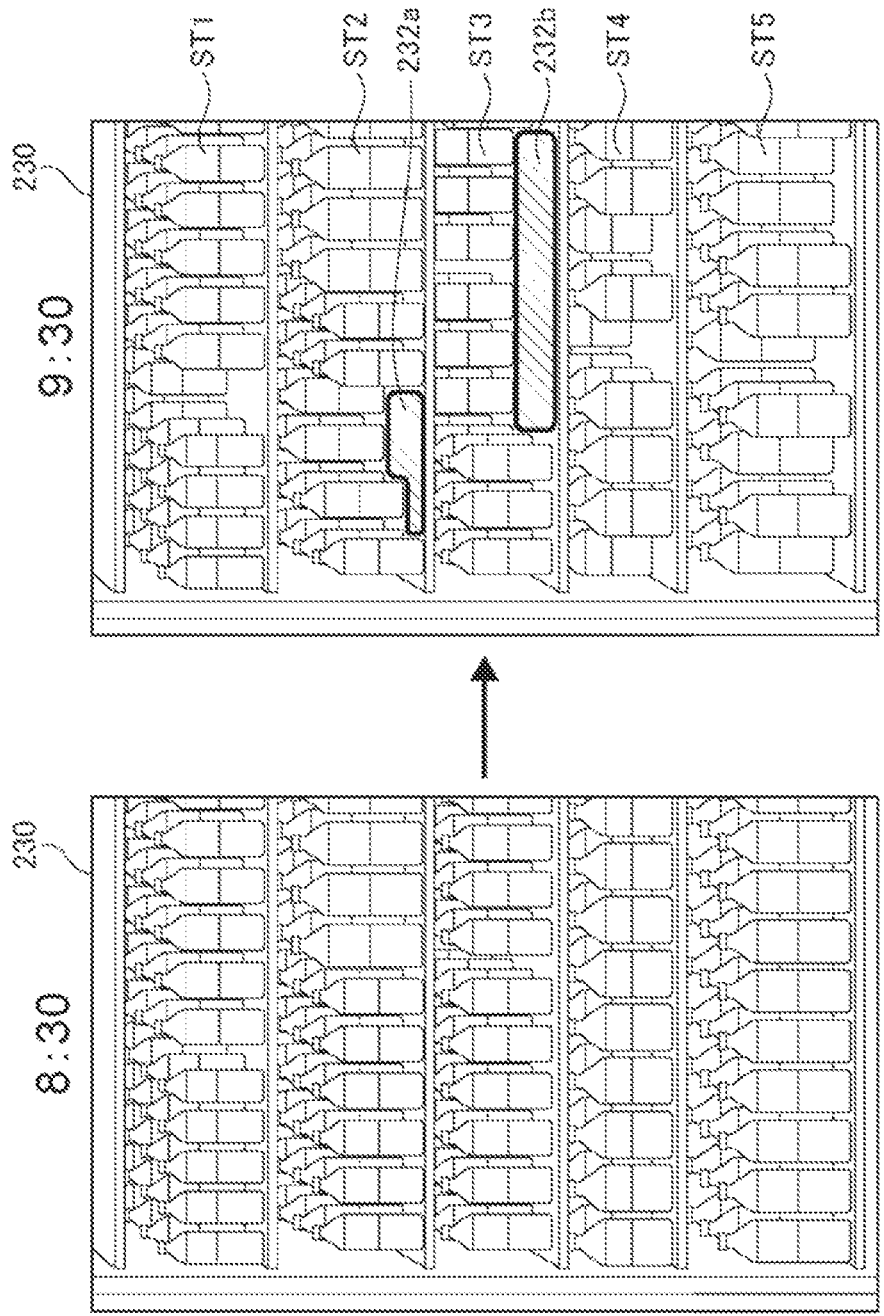

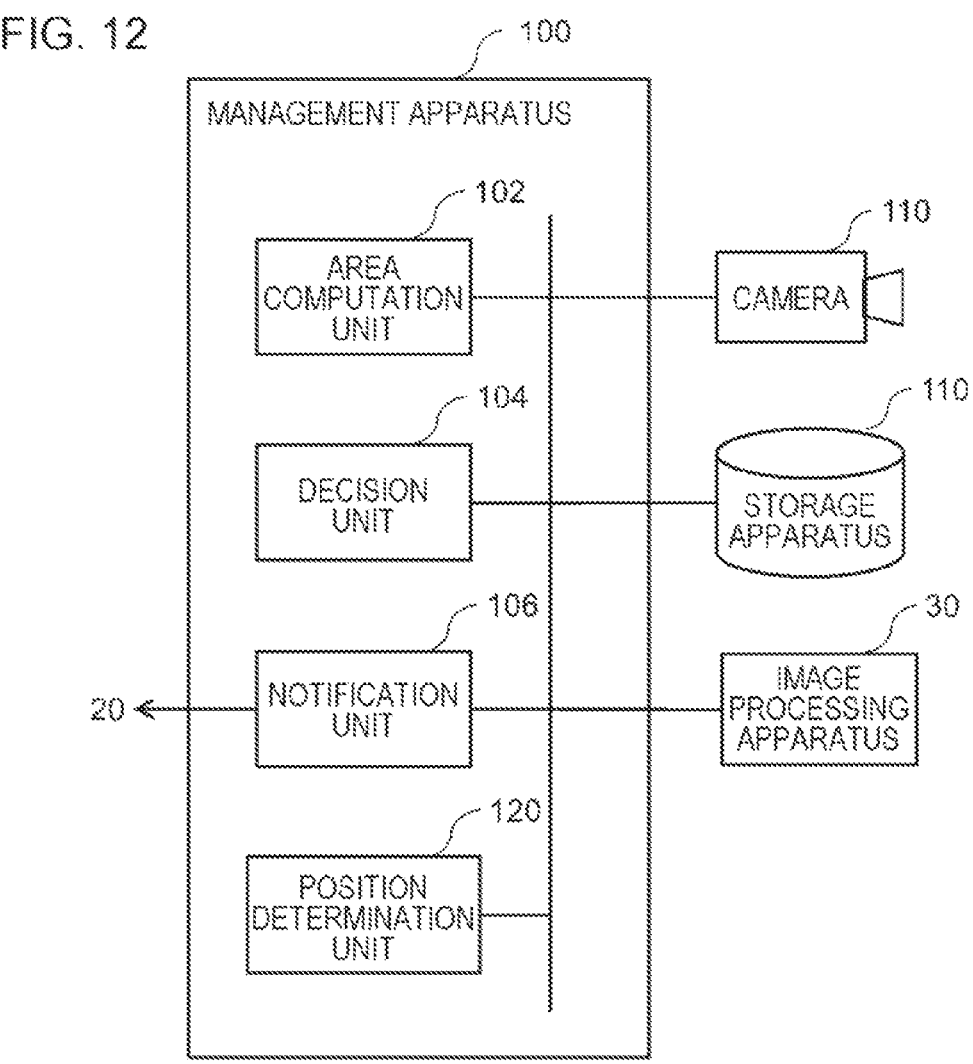

| REGION SET | NOTIFICATION |
|---|---|
| R1 and R4 (and R7) | ON |
| R2 and R5 (and R8) | ON |
| R3 and R6 (and R9) | ON |
| R7 and/or R8 and/or R9 | OFF |
| ⋮ | ⋮ |

330

| PRIORITY ORDER | REGION SET |
|---|---|
| 1 | R2+R5 |
| 2 | R1+R4 or R3+R6 |
| 3 | R1 or R2 or R3 |

332

TARGET OBJECT DETECTION APPARATUS, TARGET OBJECT DETECTION METHOD, AND NON-TRANSITORY COMPUTER-READABLE STORAGE MEDIUM

This application is a National Stage Entry of PCT/JP2020/040594 filed on Oct. 29, 2020, which claims priority from Japanese Patent Application 2019-200868 filed on Nov. 5, 2019, the contents of all of which are incorporated herein by reference, in their entirety.

TECHNICAL FIELD

The present invention relates to a management apparatus, a management method, and a program, and particularly relates to a management apparatus, a management method, and a program that manage a display shelf in a store.

BACKGROUND ART

Patent Document 1 describes that a situation of a product shelf is captured, and an image being color-coded according to a display state is superimposed and displayed (FIG. 4) in such a way that a display shortage state is clear. Patent Document 2 describes that a notification prompting restocking can be made when products are few on a product shelf, and a reorder for storing stock can be performed. In addition, there are a system (Patent Document 3) for tracking an arrangement of a product shelf by using a robot, a stock monitoring system (Patent Document 4) for monitoring stock of a product and making a notification about restocking, and the like.

RELATED DOCUMENTS

Patent Documents

[Patent Document 1] Japanese Patent Application Publication No. 2016-58105
[Patent Document 2] Japanese Patent Application Publication (Translation of PCT Application) No. 2010-517148
[Patent Document 3] Japanese Patent Application Publication (Translation of PCT Application) No. 2019-523925
[Patent Document 4] Japanese Patent Application Publication No. 2019-152934

SUMMARY OF THE INVENTION

Technical Problem

A problem in securing an employee in a store due to a labor shortage is currently growing more serious. In such a situation, it is desired to save time and effort for stock management of a product and a product restocking operation of a display shelf, and reduce a load on an employee.

The present invention has been made in view of the circumstance described above, and an object thereof is to provide a technique for improving efficiency of a restocking operation of a product to a display shelf.

Solution to Problem

In each aspect according to the present invention, each configuration below is adopted in order to solve the above-mentioned problem.

A first aspect relates to a management apparatus.

The management apparatus according to the first aspect includes:

an area computation unit that acquires an area of a displayable region of a display shelf in which a product can be displayed, and computes an area ratio of an area of a non-display region of the display shelf in which the product detected from a captured image is not displayed to the area of the display shelf;

a decision unit that decides whether to make a notification according to the area ratio; and a notification unit that makes the notification when it is decided that the notification is to be made.

A second aspect relates to a management method executed by at least one computer.

The management method according to the second aspect includes:

by a management apparatus, acquiring an area of a displayable region of a display shelf in which a product can be displayed;

computing an area ratio of an area of a non-display region of the display shelf in which the product detected from a captured image is not displayed to the area of the display shelf;

deciding whether to make a notification according to the area ratio; and making the notification when it is decided that the notification is to be made.

Note that, another aspect according to the present invention may be a program causing at least one computer to execute the method in the second aspect described above, or may be a computer-readable storage medium that stores such a program. The storage medium includes a non-transitory tangible medium.

The computer program includes a computer program code causing a computer to execute the management method on the management apparatus when the computer program code is executed by the computer.

Note that, any combination of the components above and expression of the present invention being converted among a method, an apparatus, a system, a storage medium, a computer program, and the like are also effective as a manner of the present invention.

Further, various components according to the present invention do not necessarily need to be an individually independent presence, and a plurality of components may be formed as one member, one component may be formed of a plurality of members, a certain component may be a part of another component, a part of a certain component and a part of another component may overlap each other, and the like.

Further, a plurality of procedures are described in an order in the method and the computer program according to the present invention, but the described order does not limit an order in which the plurality of procedures are executed. Thus, when the method and the computer program according to the present invention are executed, an order of the plurality of procedures can be changed within an extent that there is no harm.

Furthermore, a plurality of procedures of the method and the computer program according to the present invention are not limited to being executed at individually different timings. Thus, another procedure may occur during execution of a certain procedure, an execution timing of a certain procedure and an execution timing of another procedure may partially or entirely overlap each other, and the like.

Advantageous Effects of Invention

According to each of the aspects described above, a technique for improving efficiency of a restocking operation of a product to a display shelf can be provided.

BRIEF DESCRIPTION OF THE DRAWINGS

FIG. 1 is a block diagram schematically illustrating a configuration example of a store system according to an example embodiment of the present invention.

FIGS. 10A and 10B are diagrams each illustrating an example of an image of a display shelf at a predetermined time.

FIG. 12 is a functional block diagram illustrating a logical configuration example of the management apparatus according to the present example embodiment.

DESCRIPTION OF EMBODIMENTS

Figure 2A:
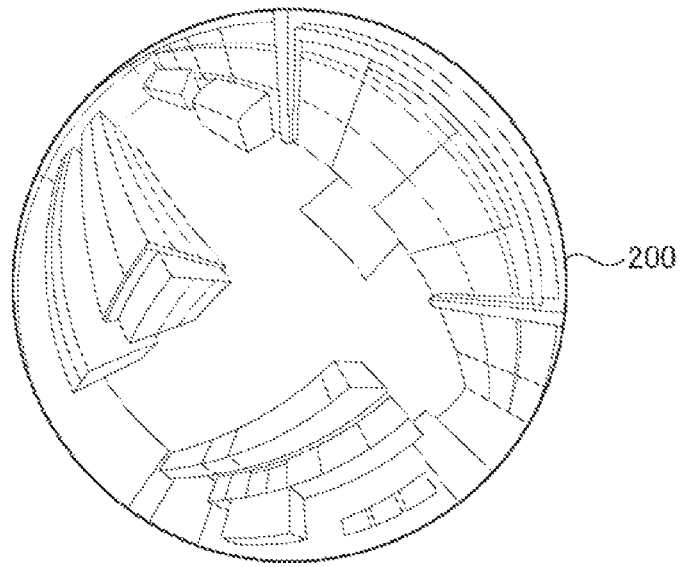
FIGS. 2A to 2C are diagrams for each describing a captured image of a camera.

Hereinafter, example embodiments of the present invention will be described with reference to the drawings. Note that, in all of the drawings, a similar component has a similar reference sign, and description thereof will be appropriately omitted. In each of the following drawings, a configuration of a portion unrelated to essence of the present invention is omitted and not illustrated.

"Acquisition" in an example embodiment includes at least one of acquisition (active acquisition), by its own apparatus, of data or information being stored in another apparatus or a storage medium, and inputting (passive acquisition) of data or information output from another apparatus to its own apparatus. Examples of the active acquisition include reception of a reply by making a request or an inquiry to another apparatus, reading by accessing another apparatus or a storage medium, and the like. Further, examples of the passive acquisition include reception of information to be distributed (transmitted, push-notified, or the like), and the like. Furthermore, "acquisition" may include acquisition by selection from among pieces of received data or pieces of received information, or reception by selecting distributed data or distributed information.

First Example Embodiment

<System Outline>

FIG. 1 is a block diagram schematically illustrating a configuration example of a store system 1 according to an example embodiment of the present invention. The store system 1 includes a management apparatus 100, a camera 5, a user terminal 20, and an image processing apparatus 30. The management apparatus 100, the camera 5, the user terminal 20, and the image processing apparatus 30 are connected to one another via a communication network 3. The image processing apparatus 30 may be included in the same hardware as the management apparatus 100, or may be provided as a different piece of hardware outside the management apparatus 100.

A display shelf 10 of a product including a showcase is installed at a store. Furthermore, the camera 5 for surveillance that captures a scene in the store is installed at the store. For example, the camera 5 may be a camera that is installed on a ceiling of a store for a purpose of preventing a crime and may perform capturing in all directions by 360 degrees. As one example, the camera 5 is a camera equipped with a fisheye lens.

The camera 5 includes a lens and a capturing element such as a charge coupled device (CCD) image sensor. For example, the camera 5 is a network camera such as an Internet protocol (IP) camera. The network camera has, for example, a wireless local area network (LAN) communication function, and is connected to the image processing apparatus 30 via a communication network, i.e., a relay apparatus (not illustrated) such as a router. Further, the camera 5 may include a mechanism for performing control of an orientation of a camera main body and a lens, zooming control, focusing control, and the like.

The user terminal 20 is a smartphone, a tablet terminal, a personal computer, and the like. In the present example embodiment, the user terminal 20 is a terminal used by a user U such as a salesclerk and a manager of a store and a management center.

The management apparatus 100 is an apparatus that manages a state of the display shelf 10 of a product of a store. The display shelf 10 is a fixture on which a product is displayed at a store, is formed by providing at least one shelf board (hereinafter also referred to as a shelf 14) on a basic outer frame 12, and is also referred to as a gondola. Herein, one display shelf 10 is assumed to be formed by providing a plurality of the shelves 14 on one basic outer frame 12.

A state of the display shelf 10 is a display state of a product 16 for each display shelf 10 or each shelf 14, and particularly indicates a stockout state of the product 16. The management apparatus 100 acquires an image of the display shelf 10 from video captured by the camera 5, and detects and manages a state of the display shelf 10, for example, stockout of the product 16 and the like.

Figure 2B:
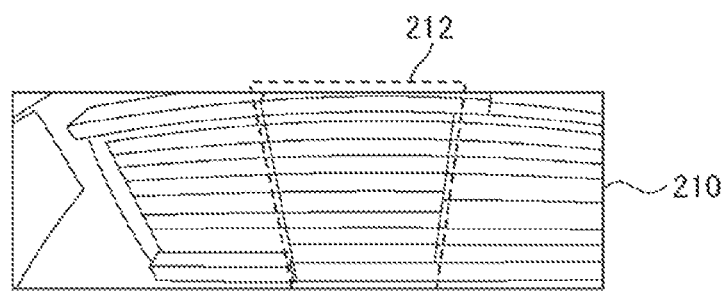
Figure 2C:
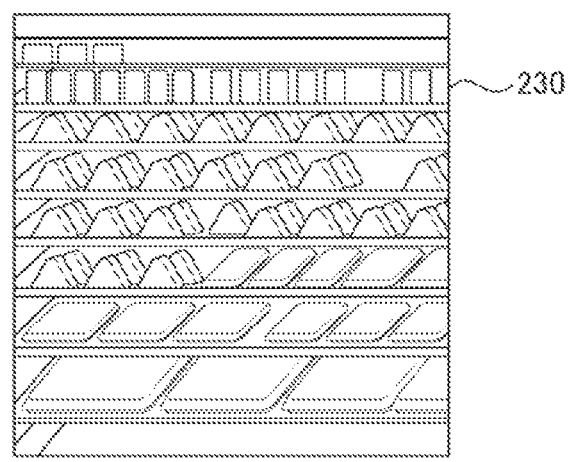

FIG. 2 is a diagram for describing a captured image of the camera 5. FIG. 2A is a diagram illustrating an image example in which the camera 5 captures the entire store from above. FIG. 2B is a diagram illustrating an image example in which the camera 5 captures the display shelf 10 from a front direction. FIG. 2C is a diagram illustrating an image example of one display shelf 10 extracted from the image in FIG. 2B.

An image 200 (FIG. 2A) captured by the camera 5 is transmitted to the image processing apparatus 30. The image 200 transmitted to the image processing apparatus 30 is video being captured in real time by the camera 5 for surveillance, or is a still image being captured regularly or at a predetermined time. However, the image 200 transmitted to the image processing apparatus 30 may not be directly transmitted from the camera 5, and may be an image being stored in a storage medium, which is not illustrated. Further, the image 200 transmitted to the image processing apparatus 30 may be an image delayed by a predetermined time.

An image 210 in FIG. 2B is an image being captured in a certain capturing direction, and three display shelves 10 are included in the image 210. The image processing apparatus 30 cuts an image 212 of each display shelf 10 of the three display shelves 10 in the image 210, performs correction processing on a curved image, and converts the display shelf 10 into an image 230 (FIG. 2C) viewed from the front. The management apparatus 100 surveys a state of the display shelf 10 by using the image 230 of the display shelf 10 on which the image processing is performed.

Figure 3:
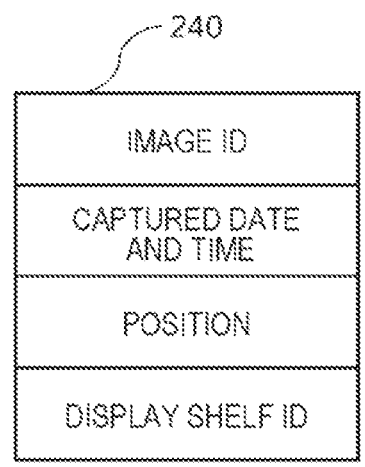
FIG. 3 is a diagram illustrating one example of a data structure of image information about each image being stored.

The image 230 of the display shelf 10 on which the image processing is performed by the image processing apparatus 30 is accumulated in a storage apparatus 110. FIG. 3 is a diagram illustrating one example of a data structure of image information 240 about each image 230 being stored. The image information 240 includes an image ID that identifies the image 230 being stored in the storage apparatus 110, a captured date and time of the image 230, and a position and identification information (display shelf ID) of the display shelf 10 being determined from a captured image. The image ID may be a path indicating a file name and a storage place of the image 230. The captured date and time may be a frame number of the image 230. The display shelf 10 in a captured image may be determined by the image processing apparatus 30 from information such as a capturing direction by the camera 5. Alternatively, the image processing apparatus 30 may recognize an image of a marker for identifying the display shelf 10 being provided in advance to the display shelf 10, and may determine the display shelf 10. Various methods of determining the display shelf 10 from a captured image are conceivable, which are not limited thereto.

Functional Configuration Example

Figure 4:
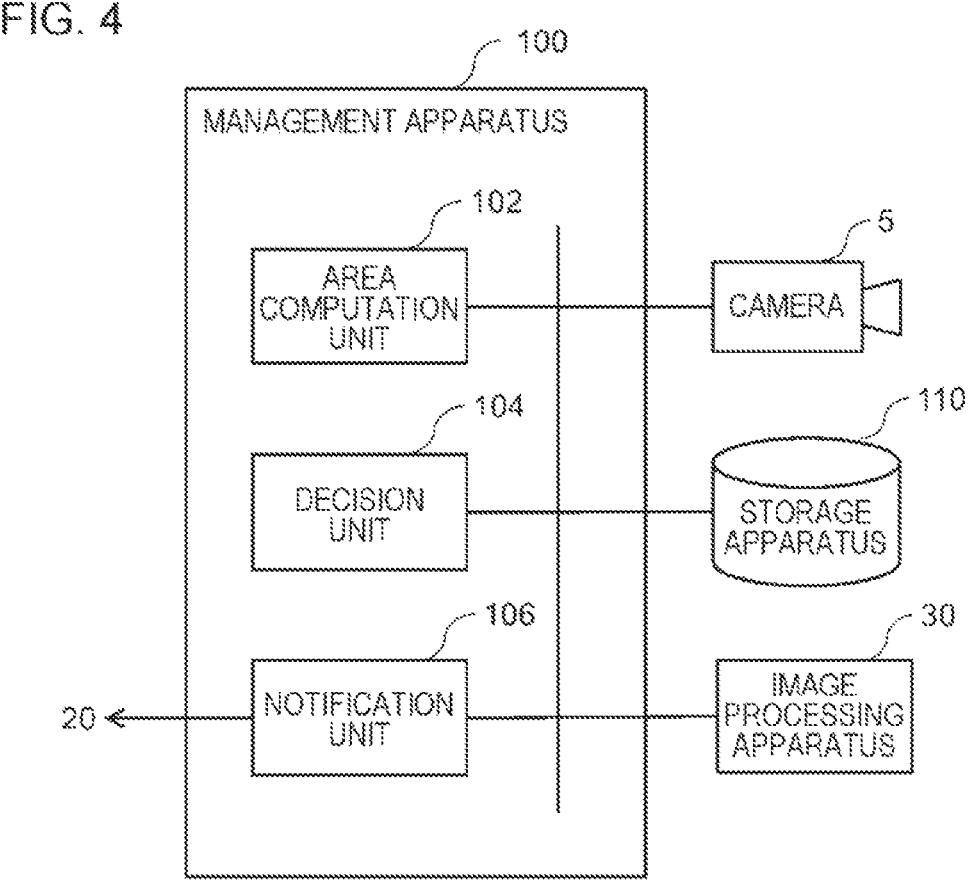
FIG. 4 is a functional block diagram logically illustrating a configuration of a management apparatus according to an example embodiment of the present invention.

FIG. 4 is a functional block diagram logically illustrating a configuration of the management apparatus 100 according to an example embodiment of the present invention. The management apparatus 100 includes an area computation unit 102, a decision unit 104, and a notification unit 106. The management apparatus 100 further includes the storage apparatus 110. The storage apparatus 110 may be provided inside the management apparatus 100, or may be provided outside. The storage apparatus 110 may be physically a plurality of storage apparatuses.

For example, an area of a displayable region of a display shelf in which a product can be displayed is stored in advance in the storage apparatus 110.

The area computation unit 102 acquires an area of a displayable region, and computes an area ratio of an area of a non-display region of the display shelf 10 in which the product 16 detected from a captured image is not displayed to an area of the display shelf 10. The decision unit 104 decides whether to make a notification according to an area ratio being computed by the area computation unit 102. The notification unit 106 makes a notification when it is decided that the notification is to be made.

FIG. 5 is a diagram illustrating an example of a data structure of shelf area information 302. The shelf area information 302 is stored in advance, in the storage apparatus 110, with a value of an area of the displayable region of each shelf 14 of each display shelf 10 in a store as setting information. The setting information can be referred to by an operator, and can be changed at any time due to a change in a layout of the display shelf 10 or the shelf 14 at a store.

Herein, an "area of a displayable region" is indicated by a square number of a plane of a displayable region of the shelf 14, which is not limited thereto, and each dimension indicating a shape of a displayable region in the shelf 14 may be used. For example, when a shape of a displayable region of the shelf 14 is rectangular, a dimension of a width and a dimension of a depth of a displayable region of the shelf 14 may be used. In other words, information from which an area of a displayable region of the shelf 14 can be acquired may be used.

Figure 5A:
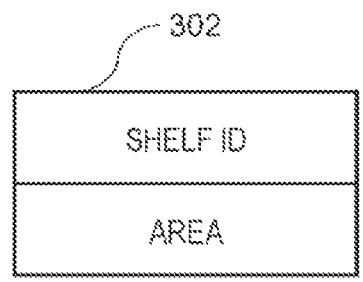
FIGS. 5A to 5C are diagrams each illustrating an example of a data structure of shelf area information.
Figure 5B:
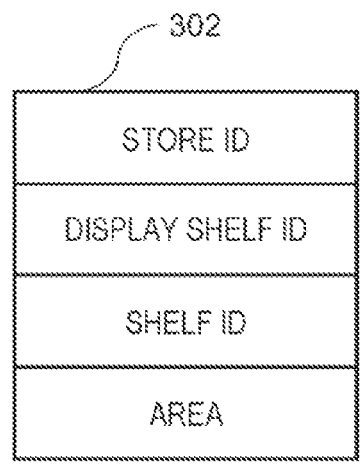
Figure 5C:
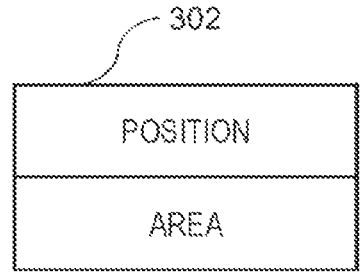

In the example in FIG. 5A, in the shelf area information 302, a shelf ID and an area of a product displayable region of the shelf 14 are stored in association with each other. The shelf ID in this example includes identification information that identifies each display shelf 10 installed at a store being a management target and identifies each shelf 14 of the display shelf 10. In the example in FIG. 5B, in the shelf area information 302, a store ID, a display shelf ID, a shelf ID, and an area of a product displayable region are stored in association with one another. The display shelf ID may include, for example, information indicating an installation position of the display shelf 10 in a store. A position of the display shelf 10 in a captured image of the camera 5 can be determined from a captured position in a store of the captured image, and the corresponding display shelf 10 can be determined. Furthermore, in the example in FIG. 5C, in the shelf area information 302, an area of a product displayable region of the shelf 14 may be associated with position information about the display shelf 10 or each shelf 14 of the display shelf 10 and may be stored. The position information may be relative position information indicating a relative position of each display shelf 10 in a store, may be absolute position information indicated by longitude, latitude, and the like, or may be information that can determine the shelf 14. A position of each shelf 14 may be information indicating a number of the shelf 14 in the display shelf 10, or may be information indicating a height at which the shelf 14 is installed.

The area computation unit 102 computes an area ratio of an area of a detected non-display region to an area of a displayable region of each shelf 14. Hereinafter, an example of a specific method of computing an area ratio will be described, which is not limited thereto. Specifically, for example, the area computation unit 102 first detects a shelf region from the image 230 by image recognition processing by using the image processing apparatus 30, and determines an area of a portion of the shelf region in which the product 16 is not placed. Then, the area computation unit 102 acquires an area of the shelf region of the shelf 14 from the shelf area information 302 in FIG. 5, and computes an area ratio.

Further, an area of each region may not be necessarily determined, and a ratio in an image may be acquired. For example, the area computation unit 102 detects a shelf region, and also determines, as a non-display region, a region of a portion in which the product 16 is not placed in the shelf region of each shelf 14. Then, the area computation unit 102 acquires a ratio of a non-display region to the shelf region in a shelf image, and sets the ratio as an area ratio.

Further, as one example, when a non-display region is equal to or more than a threshold value (for example, 80%), the decision unit 104 decides that a notification is to be made; and further when a non-display region is less than the threshold value, the decision unit 104 decides that a notification is not to be made.

Figure 6:
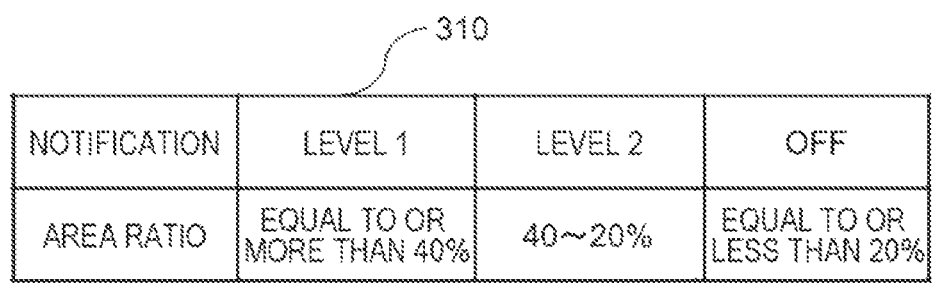
FIG. 6 is a diagram illustrating one example of a data structure of notification reference information indicating a decision reference.

FIG. 6 is a diagram illustrating one example of a data structure of notification reference information 310 indicating a decision reference. In this example, an area ratio being a decision reference is associated with each of a plurality of notification levels. The plurality of notification levels can be set, and a notification method and a notification content can be set for each level. In this example, a level 1 and a level 2 are set. When a non-display region is equal to or more than 40%, the decision unit 104 decides that a level is the notification level 1. When a non-display region is 20% to 40%, the decision unit 104 decides that a level is the notification level 2. However, a decision reference value is one example, which is not limited thereto.

At the notification level 2, for example, a notification instructing restocking of the product 16 may be transmitted to the user terminal 20 of a salesclerk of a store. At the notification level 1, for example, a notification indicating that the product 16 is in a stockout state and instructing a salesclerk to immediately restock the product 16 may be further transmitted to the user terminal 20 of a manager of a store and a management center. As a notification method, message transmission to the user terminal 20, pop-up screen display, vibration sounding, a voice output, and the like are conceivable, which are not limited thereto.

Figure 7:
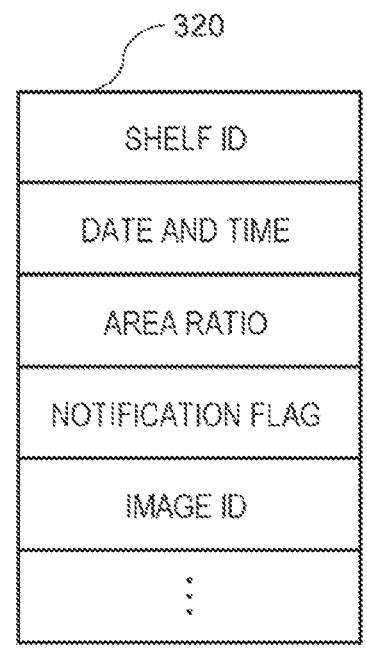
FIG. 7 is a diagram illustrating one example of a data structure of display state information.

The decision unit 104 stores a decision result as display state information 320 in the storage apparatus 110. FIG. 7 is a diagram illustrating one example of a data structure of the display state information 320. The display state information 320 stores, for each shelf, a shelf ID, a date and time (a captured date and time of an image, a decision date and time, and the like), an area ratio, a notification flag (for example, "1" when a notification is to be made, "0" when a notification is not to be made, and the like), and an image ID (for example, being associated with an image ID of the image information 240) of a captured image of the shelf 14 in association with one another.

Hardware Configuration Example

Figure 8:
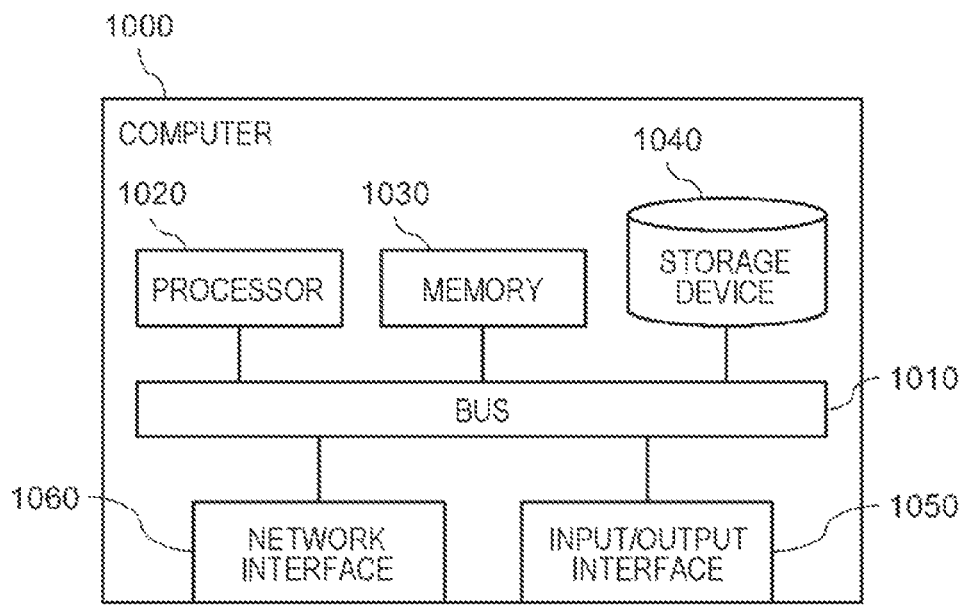
FIG. 8 is a block diagram illustrating a hardware configuration of a computer that achieves the management apparatus illustrated in FIG. 4.

FIG. 8 is a block diagram illustrating a hardware configuration of a computer 1000 that achieves the management apparatus 100 illustrated in FIG. 4. The computer 1000 includes a bus 1010, a processor 1020, a memory 1030, a storage device 1040, an input/output interface 1050, and a network interface 1060.

The bus 1010 is a data transmission path for allowing the processor 1020, the memory 1030, the storage device 1040, the input/output interface 1050, and the network interface 1060 to transmit and receive data with one another. However, a method of connecting the processor 1020 and the like to each other is not limited to bus connection.

The processor 1020 is a processor achieved by a central processing unit (CPU), a graphics processing unit (GPU), and the like.

The memory 1030 is a main storage apparatus achieved by a random access memory (RAM) and the like.

The storage device 1040 is an auxiliary storage apparatus achieved by a hard disk drive (HDD), a solid state drive (SSD), a memory card, a read only memory (ROM), or the like. The storage device 1040 stores a program module that achieves each function of the computer 1000. The processor 1020 reads each program module onto the memory 1030 and executes the program module, and each function associated with the program module is achieved. Further, the storage device 1040 also stores each piece of information being stored in the storage apparatus 110.

The program module may be stored in a storage medium. The storage medium that stores the program module may include a non-transitory tangible medium usable by the computer 1000, and a program code readable by the computer 1000 (the processor 1020) may be embedded in the medium.

The input/output interface 1050 is an interface for connecting the computer 1000 and various types of input/output equipment.

The network interface 1060 is an interface for connecting the computer 1000 to a communication network. The communication network is, for example, a local area network (LAN) and a wide area network (WAN). A method of connection to the communication network by the network interface 1060 may be wireless connection or wired connection.

Then, the computer 1000 is connected to necessary equipment (for example, a display apparatus such as a touch panel, an input apparatus, the camera 5, a microphone, and a speaker) via the input/output interface 1050 or the network interface 1060.

Further, the user terminal 20 that receives a notification from the management apparatus 100 can also be similarly achieved by the computer 1000 having the configuration in FIG. 8.

In the present example embodiment, an application for receiving a notification from the management apparatus 100 is installed in advance in the user terminal 20. Alternatively, by connecting to the Internet such as a browser, an application that can access a user page of a Web site provided by the management apparatus 100 may be installed. The user page is assumed to be able to be referred to by inputting authentication information being registered by a user in advance, and logging in. Then, information indicating a notification content may be provided on the user page.

Each component of the management apparatus 100 according to the present example embodiment in FIG. 4 is achieved by any combination of hardware of the computer 1000 and software in FIG. 8. Then, various modification examples of an achievement method and an apparatus thereof are understood by a person skilled in the art. A functional block diagram illustrating the management apparatus 100 according to each embodiment described below illustrates a block of logical functional units instead of a configuration of hardware units.

Operation Example

Figure 9:
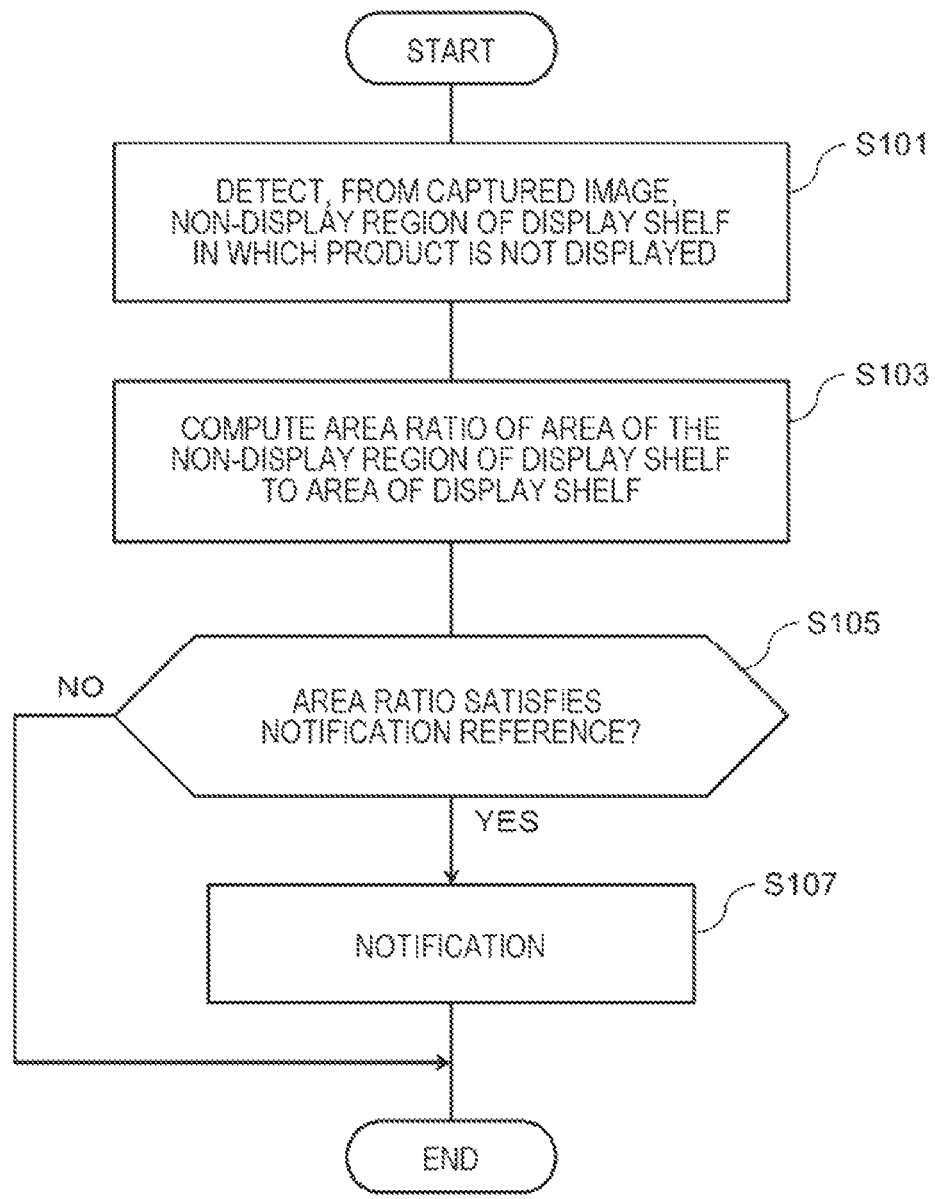
FIG. 9 is a flowchart illustrating one example of an operation of the management apparatus according to the present example embodiment.

FIG. 9 is a flowchart illustrating one example of an operation of the management apparatus 100 according to the present example embodiment.

First, in the management apparatus 100, the area computation unit 102 detects, from the captured image 230, a non-display region of the display shelf 10 in which the product 16 is not displayed, by using the image processing apparatus 30 (step S101).

FIG. 10 is a diagram illustrating an example of the image 230 of the display shelf 10 at a predetermined time. For example, FIG. 10A is the captured image 230 of the display shelf 10 at 8:30, and FIG. 10B is the captured image 230 of the display shelf 10 at 9:30 after an hour from FIG. 10A. At a point in time at 8:30, the display shelf 10 is all filled.

Next, the area computation unit 102 acquires an area of a displayable region of the shelf 14 of the display shelf 10, and computes an area ratio of an area of a non-display region of the shelf 14 to the area of the displayable region (step S103). At the point in time at 8:30 in FIG. 10A, an area ratio of the area of the non-display region to the area of the displayable region of each shelf 14 is 0%. Therefore, the area ratio does not satisfy a notification reference (NO in step S105), and thus the decision unit 104 decides that a notification is not to be made, and ends the present processing by bypassing step S107.

The area computation unit 102 in step S103 acquires the area of the displayable region of the shelf 14 of the display shelf 10 being stored in the storage apparatus 110, which is not limited thereto. For example, an input of the user U may be received, or the area may be computed and acquired from the captured image 230, based on information such as a marker provided on the shelf 14.

Meanwhile, also at the point in time at 9:30 in FIG. 10B, the area computation unit 102 detects a non-display region of each shelf 14 by using the image processing apparatus 30 in step S101, and computes an area ratio of each shelf 14 (step S103). As a result, it is assumed that an area ratio of an area of the non-display region to an area of a displayable region of the shelf 14 is, for example, between 20% and 40% in a shelf ST2, the area ratio is equal to or more than 40% in a shelf ST3, and the area ratio is less than 20% in another shelf (step S103). As a result of deciding whether the area ratio satisfies a notification reference for each shelf 14 by the decision unit 104, the shelf ST2 is decided to be at a notification level 2 (YES in step S105), the shelf ST3 is decided to be at a notification level 1 (YES in step S105), and no notification is decided for the another shelf (NO in step S105).

Therefore, the processing for the shelf ST2 and the shelf ST3 proceeds to step S107, and the notification unit 106 makes a notification associated with each of the notification levels. For the another shelf, the present processing ends by bypassing step S107.

Figure 11A:
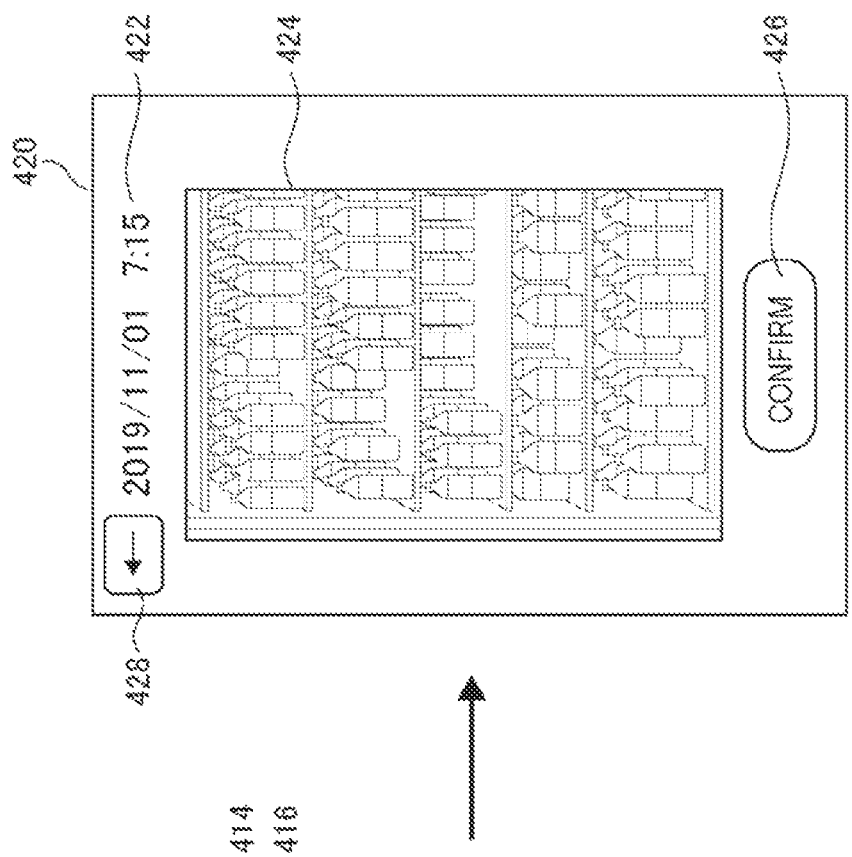
FIGS. 11A and 11B are diagrams each illustrating one example of a notification screen by a notification unit according to the present example embodiment.
Figure 11B:
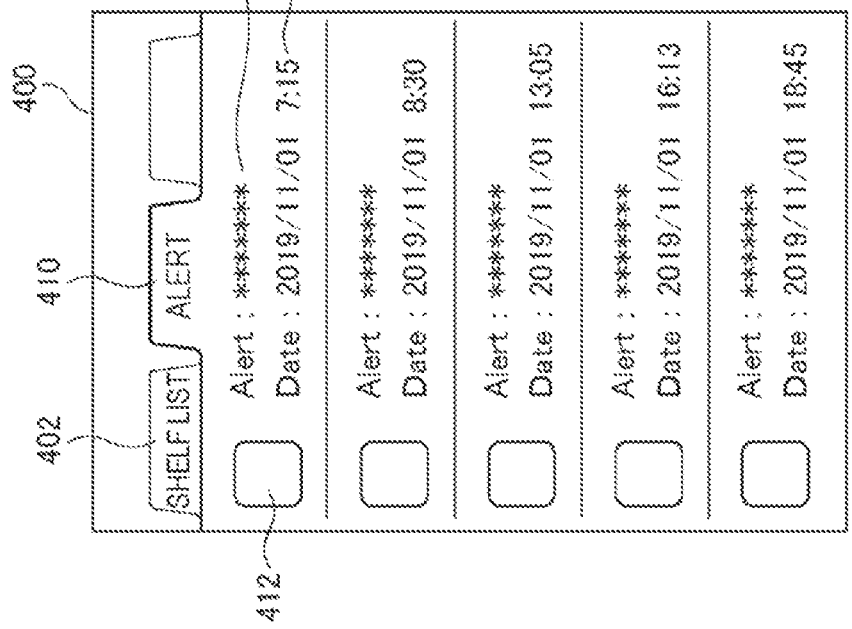

FIG. 11 is a diagram illustrating one example of a notification screen by the notification unit 106 according to the present example embodiment. A notification screen 400 in FIG. 11A includes a shelf list tab 402 and a notification list tab 410. The shelf list tab 402 displays, for example, a list (not illustrated) of all the display shelf 10 at each store. The notification list tab 410 displays a list of notification contents by the notification unit 106. The list includes, for each notification, a thumbnail image 412, a notification content display portion 414, and a notification date and time display portion 416.

The thumbnail image 412 is a thumbnail image of the front image 230 of the shelf 14 being a notification target. Identification information about the shelf 14 and a notification level may be indicated in the notification content display portion 414. Alternatively, a message, such as "shelf AAA: stockout 35%", indicating that the shelf 14 whose identification information (may be a name for notification display (for example, a "box lunch")) is a "shelf AAA" is in a stockout state, and a value of an area ratio of a non-display region being computed by the area computation unit 102 may be indicated. The notification content display portion 414 is one example, which is not limited thereto. For example, a notification content may be indicated in the notification content display portion 414 by using an icon by notification level, a band chart indicating an area ratio, and the like. The notification date and time display portion 416 displays a date and time of capturing of the image 230 of the shelf 14 decided that a notification is necessary, or a decision date and time.

Furthermore, by selecting each notification column in FIG. 11A, the screen is shifted to a detailed content screen 420 (FIG. 11B) of each notification. In the example in FIG. 11B, the detailed content screen 420 includes a notification date and time display portion 422, a shelf image display portion 424, a confirmation button 426, and a return button 428. The notification date and time display portion 422 displays a date and time of capturing of the image 230 of the shelf 14 decided that a notification is necessary, or a decision date and time. The image 230 of the shelf 14 is displayed in the shelf image display portion 424, and a scene of the shelf 14 in which the product 16 is in a stockout state is captured in the image 230. The confirmation button 426 receives an operation indicating that the user U of the user terminal 20 confirms the notification. The return button 428 receives an operation of returning to display of the screen of the notification list tab 410 in FIG. 11A.

As described above, in the present example embodiment, the area computation unit 102 computes an area ratio of an area of a non-display region to an area of a displayable region of each shelf 14, and the notification unit 106 makes a notification for a shelf decided according to the area ratio by the decision unit 104 that a notification is to be made.

In this way, according to the present example embodiment, a stockout state of the product 16 on each shelf 14 of each display shelf 10 at a store can be detected from the image 230 of the camera 5, and a notification can be made.

Second Example Embodiment

FIG. 12 is a functional block diagram illustrating a logical configuration example of a management apparatus 100 according to the present example embodiment. The management apparatus 100 according to the present example embodiment is similar to the example embodiment described above except for a point that the management apparatus 100 according to the present example embodiment further makes a notification decision according to a position of a non-display region in addition to the area ratio of the non-display region. The management apparatus 100 according to the present example embodiment further includes a position determination unit 120 in addition to the configuration of the management apparatus 100 in FIG. 4.

The position determination unit 120 determines a position of a non-display region from a captured image 230. A decision unit 104 decides that a notification is to be made when an area ratio satisfies a reference for making a notification, and a position of a non-display region also satisfies the reference.

A position of a region is indicated by, for example, a place or a salesroom of the display shelf 10 in the store, a kind of a product 16 displayed on the display shelf 10, a position (a shelf number, up, down, center, or the like) of the shelf 14 in the display shelf 10, an arrangement in the shelf 14, and the like.

Figures 13A, 13B, 13C:
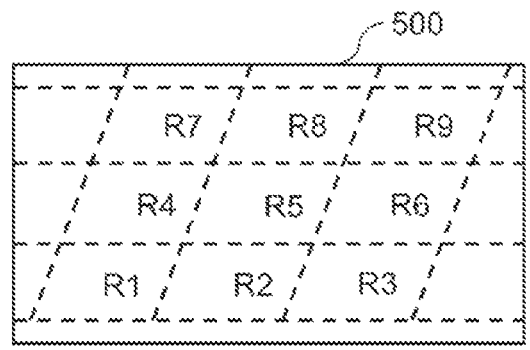
FIGS. 13A to 13C are diagrams for each describing a setting method of a decision reference.

FIG. 13 is a diagram for describing a setting method of a decision reference when a position of a region is set for each shelf 14. In the example in FIG. 13A, a shelf image region 500 of each shelf 14 is cut from the captured image 230 of the display shelf 10, and is divided into nine regions R1 to R9.

In a first example, as illustrated in FIG. 13B, in notification region reference information 330, a region (for example, at least the region R1 and the region R4) for which a notification is to be made when being distinguished as a non-display region is specified. In other words, when the product 16 is not present from the front toward the back of the shelf 14 (at least in the region R1 and the region R4), it is decided that the product 16 that needs to be displayed in the region is out of stock.

Herein, for discrimination on whether each region is included in a non-display region, when a proportion of a region from which the product 16 is not detected exceeds a predetermined proportion (for example, 90%) of the region, discrimination is made that the region is included in the non-display region.

In a second example, in the notification region reference information 330, a region (for example, at least any one of the region R7, the region R8, and the region R9 in one row on the back side of the shelf 14) for which a notification is not to be made (notification OFF) when being distinguished to be a non-display region may be specified. In other words, when the product 16 is not present in one row on the back side of the shelf 14 (for example, at least any one of the region R7, the region R8, and the region R9) in a non-display region, the product 16 is in a state of being placed on the front side of the shelf 14, and a notification may not be made.

Furthermore, a priority order may be provided to a region, and a decision and a notification may be performed by prioritizing a region having a high priority order. For example, when the product 16 is not present in a region in which the product 16 needs to be displayed, such as a front row and center of the shelf 14, a notification for placing the product 16 on the front side is preferably made. Thus, as illustrated in FIG. 13C, in notification priority order information 332, a region for a notification is to be made is specified with a priority order. The decision unit 104 makes a decision by following a priority order in the notification priority order information 332, and prioritizing a combination of regions having a high priority order.

A method of prioritization includes, for example, as the higher a priority order, shortening a cycle of decision processing, or increasing a notification level.

Further, a position of a non-display region may be stored by a shape of the region, and whether a degree of coincidence with the shape of the non-display region is equal to or more than a predetermined proportion may be set as a decision reference.

Figure 14A:
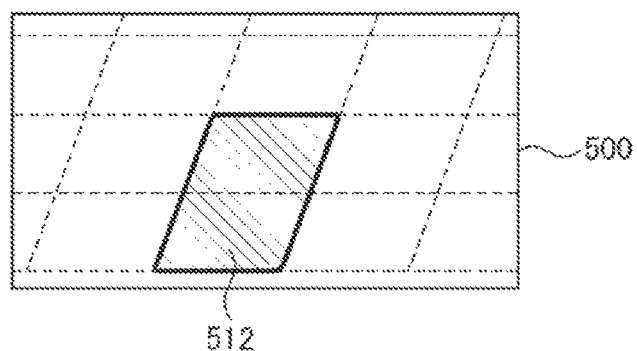
FIGS. 14A to 14C are diagrams each illustrating an example of a region shape being a decision reference in a shelf image region.
Figure 14B:
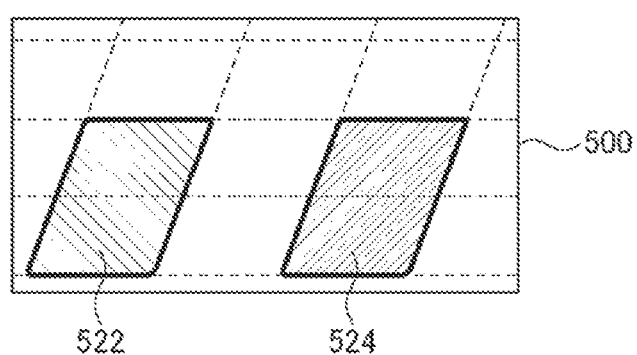
Figure 14C:
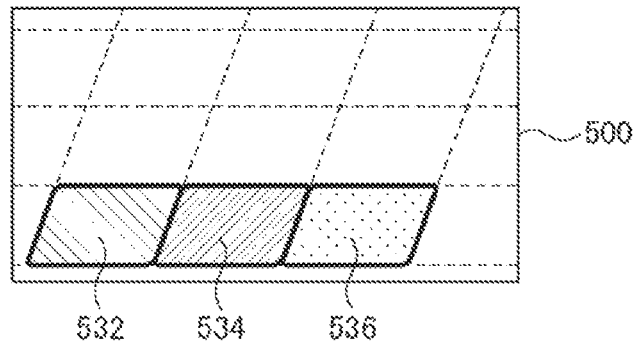

FIG. 14 is a diagram illustrating an example of a region shape being a decision reference in a shelf image region 500. FIG. 14A illustrates a shape 512 of a region having a first priority order in the notification priority order information 332 in FIG. 13C. Furthermore, FIG. 14A illustrates a position, in the shelf image region 500, of the region R2 and the region R5 included in the shape 512. FIG. 14B illustrates a shape 522 or a shape 524 of a region having a second priority order in the notification priority order information 332 in FIG. 13C. Furthermore, FIG. 14B illustrates each position, in the shelf image region 500, of a region of the region R1 and the region R4 or a region of the region R3 and the region R6 being included in the shape 522 or the shape 524. FIG. 14C illustrates a shape 532, a shape 534, and a shape 536 of a region having a third priority order in the notification priority order information 332 in FIG. 13C. FIG. 14C illustrates each position, in the shelf image region 500, of the region R1, the region R2, and/or the region R3 being included in each shape.

Each shape being a decision reference thereof is stored in advance in a storage apparatus 110 for each shelf 14. The position determination unit 120 determines a shape of a non-display region detected from the image 230. Then, the decision unit 104 compares the determined shape of the non-display region with the shape stored in the storage apparatus 110 by using an image processing apparatus 30, and computes a degree of coincidence. When the degree of coincidence is equal to or more than a predetermined proportion (for example, 80%), the decision unit 104 decides that a notification is to be made. When the degree of coincidence is less than the predetermined proportion, the decision unit 104 decides that a notification is not to be made.

Further, the decision unit 104 changes, according to a time period, a threshold value for the display shelf 10 in a predetermined position, and decides whether to make a notification by using the changed threshold value. The threshold value is stored as notification reference setting information 340 in the storage apparatus 110.

Figure 15:
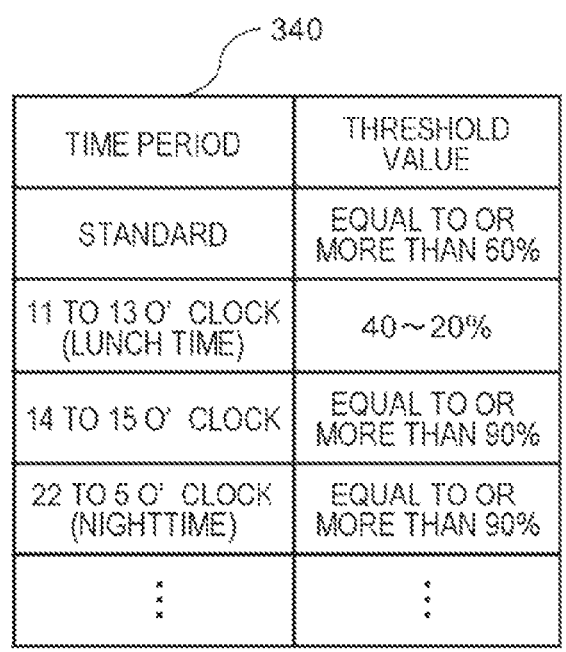
FIG. 15 is a diagram illustrating one example of a data structure of notification reference setting information.

FIG. 15 is a diagram illustrating one example of a data structure of the notification reference setting information 340. The notification reference setting information 340 may be set for each display shelf 10, each shelf 14, or each kind of the displayed product 16. For example, in a lunch time period, a threshold value of the shelf 14 of the display shelf 10 on which a box lunch is displayed is changed to a set value (for example, 40 to 20%) having a threshold value lower than that at a standard time in the display shelf 10 or the shelf 14 on which the other products 16 are displayed. The reason is that a notification is to be made earlier in order to prevent a stockout state in the lunch time period. Further, in the shelf 14 of a box lunch immediately after lunch and in a time period at nighttime, the threshold value is changed to a set value (for example, equal to or more than 90%) higher than that at a standard time. The reason is that customers are few at nighttime, and thus a box lunch in short supply has no problem.

Furthermore, a threshold value may be able to be changed according to a season, a month, a week, a day of the week, a specific period, a specific date and time, and the like other than a time period. For example, different threshold values between a weekday and a weekend may be set in the notification reference setting information 340. Furthermore, a threshold value different from a standard may be set during a campaign period for a specific product 16 in the notification reference setting information 340.

Further, in the example in FIG. 15, only a reference for whether to make a notification is specified, but, as described above, a threshold value for each notification level may be able to be changed by a time zone and the like.

Furthermore, when the product 16 is not displayed in a specific position of the display shelf 10, the decision unit 104 may decide that a notification is to be made unconditionally, based on a position of a non-display region.

In this example, for example, when the product 16 is not displayed in a position (the region R2 and the region R5) having a first priority order described in FIG. 14, the decision unit 104 can bypass decision processing by another decision reference, and decide that a notification is to be made. Particularly, by specifying a position in which a stockout state is desired to be predominantly monitored, a notification can be made with top priority. As a specific position, for example, a specific display shelf 10 in a store, a specific shelf 14 in the display shelf 10, a specific region in the shelf 14, or either the display shelf 10 or the shelf 14 on which a specific product 16 is displayed can be specified. Specific position information being specified is stored in advance in the storage apparatus 110. Furthermore, a specification may be made in association with a time zone, a date and time, a period, and the like in which the specification becomes valid.

As described above, in the present example embodiment, various decision references for making a notification can be set and changed, and thus a notification can be efficiently made with a reference following a need on a scene such as a store and a company policy on a manager side.

Third Example Embodiment

Figure 16:
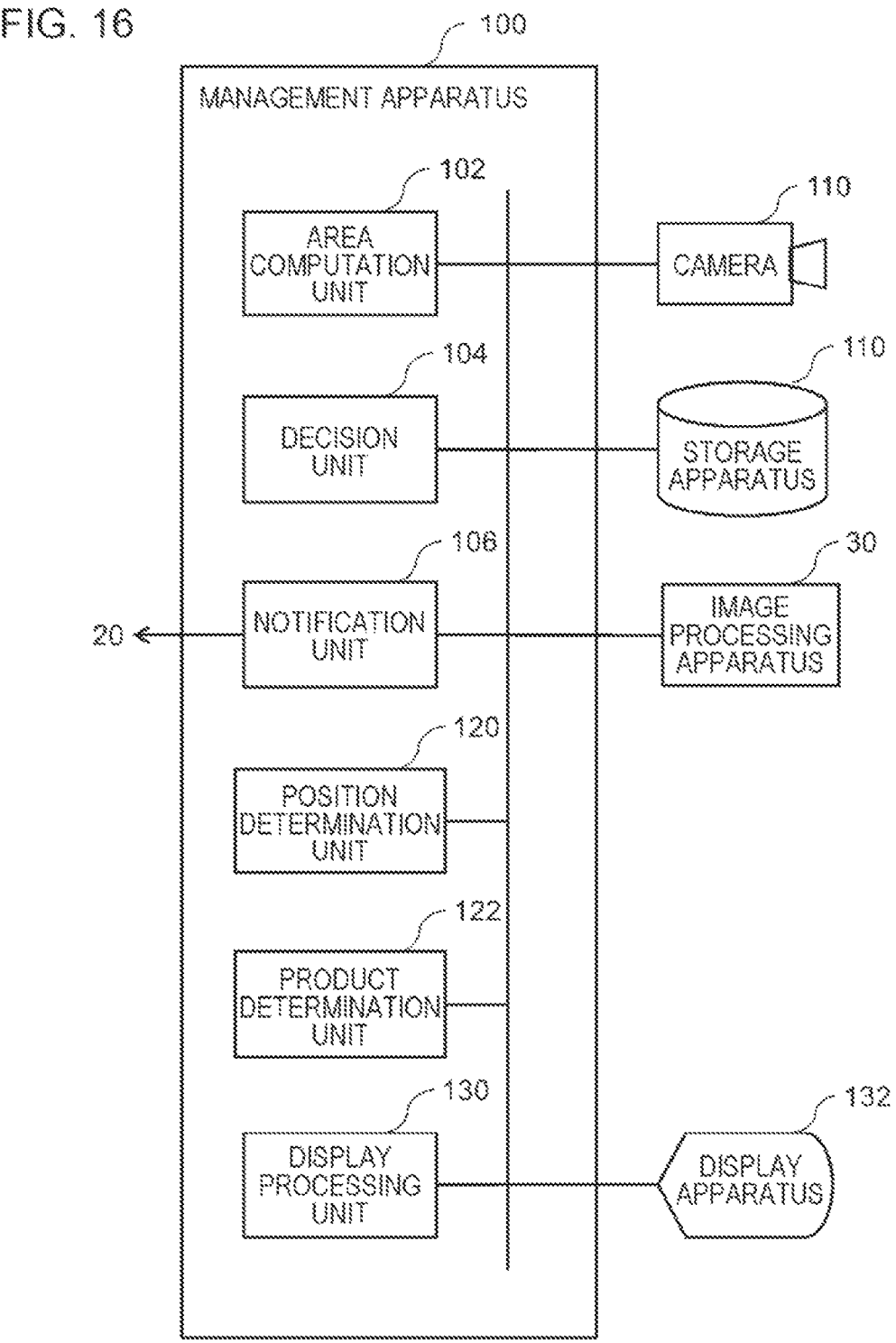
FIG. 16 is a functional block diagram illustrating a logical configuration example of the management apparatus according to the present example embodiment.

FIG. 16 is a functional block diagram illustrating a logical configuration example of a management apparatus 100 according to the present example embodiment. The management apparatus 100 according to the present example embodiment is similar to at least any one of the other example embodiments described above except for a point that the management apparatus 100 according to the present example embodiment has a configuration for determining a product 16 that needs to be displayed in a detected non-display region, and providing information related to the product. The management apparatus 100 according to the present example embodiment can be combined as long as the present example embodiment is not inconsistent with at least any one of the other example embodiments described above.

The management apparatus 100 further includes a product determination unit 122 and a display processing unit 130 in addition to the configuration of the management apparatus 100 in FIG. 12. The product determination unit 122 determines the product 16 displayed in a non-display region of a display shelf 10 determined by a position determination unit 120, based on a position of the non-display region in the display shelf 10. The display processing unit 130 displays, on a display apparatus 132, character information and an image related to the determined product 16.

The display apparatus 132 may be a display apparatus of a user terminal 20, or a terminal apparatus (not illustrated) of a management center. Further, information and the like may be provided on a Web page that can be viewed by logging in a Web site provided by the management apparatus 100 from the user terminal 20.

For example, character information related to the product 16 is information indicating a name, a product code, a price, and the like of the product 16. Furthermore, a uniform resource locator (URL) of a Web page that introduces the product 16 may be included.

Figure 17A:
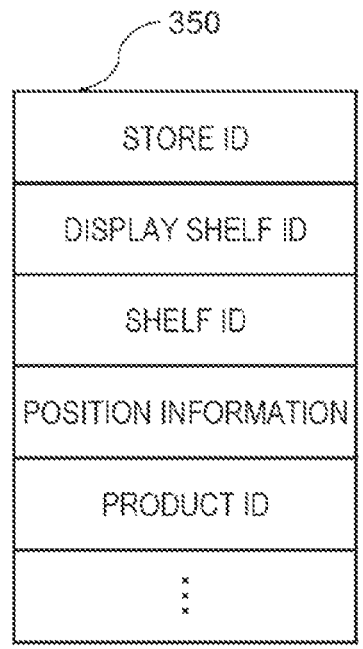
FIGS. 17A and 17B are diagrams illustrating one example of a data structure of product display information and product information.
Figure 17B:
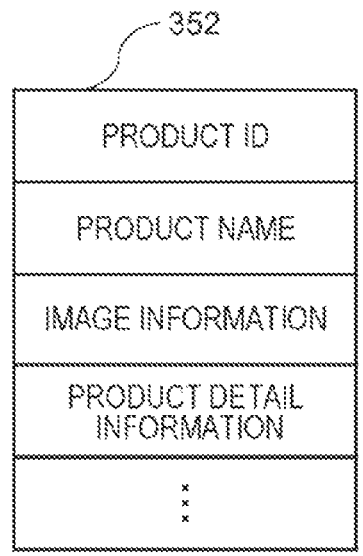

FIG. 17 is a diagram illustrating one example of a data structure of product display information 350 and product information 352. In the product display information 350, a store ID, a display shelf ID, a shelf ID, position information, and a product ID are associated with one another. In other words, in the product display information 350, position information in which the product 16 is displayed is stored for each store, each display shelf 10, and each shelf 14.

In the product information 352, a product ID, a product name, image information, and product detail information are associated with one another. The product ID is not particularly limited as long as the product ID is identification information that can determine a product, and is, for example, a product code. The image information includes at least an image file name of an image of the product and a path of a place where the image file is stored. The product detail information may include information such as a price, a sales source, a uniform resource locator (URL) of a Web site of product introduction information, for example.

Information (the product display information 350) about a display place of a product of the product information 352 may be associated with information for each product of the product information 352.

Then, a notification unit 106 may make a notification indicating that the product 16 is in a stockout state, together with information about a display position of the product 16 determined by the product determination unit 122. When a notification is received by the user terminal 20, a user U can view, by using the user terminal 20, information about the product 16 in a stockout state being displayed by the display processing unit 130, and can efficiently restock the product 16 onto the shelf 14 of the notified display shelf 10.

Figure 18:
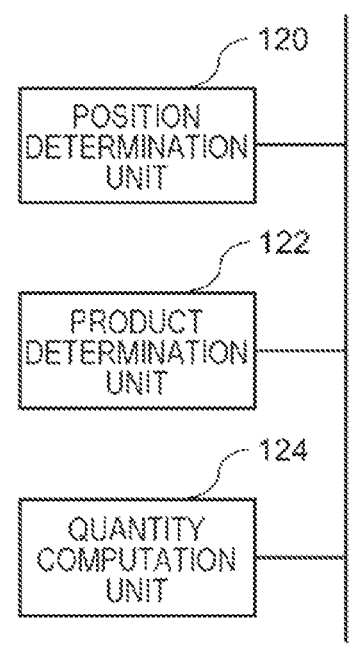
FIG. 18 is a functional block diagram illustrating another partial logical configuration example of the management apparatus according to the present example embodiment.

Furthermore, as illustrated in FIG. 18, the management apparatus 100 may further include a quantity computation unit 124 in addition to the configuration in FIG. 16. The quantity computation unit 124 computes a quantity of a determined product 16, based on an area of a non-display region. Furthermore, the product information 352 in FIG. 17B further includes information about a size (for example, a region occupied area per product during display) of a product. First, the quantity computation unit 124 computes a region in which the product 16 is displayed in a detected non-display region. Then, the quantity computation unit 124 computes a quantity of the product 16 in a stockout state from an area of the computed region and an occupied area of the product.

In this way, a quantity of the product 16 that needs to be restocked is made more clear, and thus a restocking operation can be efficiently performed.

According to the present example embodiment, a similar effect to that in the example embodiments described above can be achieved, and, furthermore, the product 16 displayed in a detected non-display region can be determined, and thus it is possible to make a notification of the product 16 in a stockout state on the shelf 14 of the display shelf 10, and the user U can efficiently restock the product 16 in a stockout state.

While the example embodiments of the present invention have been described with reference to the drawings, the example embodiments are only exemplification of the present invention, and various configurations other than the above-described example embodiments can also be employed.

Each setting such as a threshold value and region being a decision reference described in the example embodiments described above may be specified by a salesclerk and a manager of a store for each store, but may also be able to be managed at a management center, and a set value of each store may be able to be specified.

Figure 19:
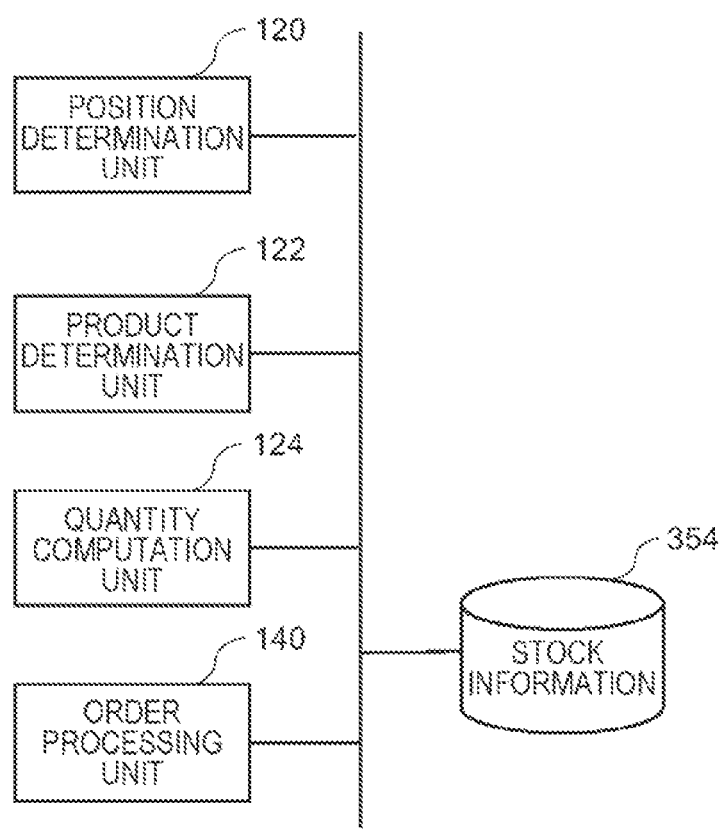
FIG. 19 is a functional block diagram illustrating another partial logical configuration example of the management apparatus according to the present example embodiment.

Further, in another example embodiment illustrated in FIG. 19, a management apparatus 100 may further include an order processing unit 140 in addition to the configuration in FIG. 18. The order processing unit 140 can perform order processing of a product 16 in a stockout state, based on the product 16 determined by a product determination unit 122 and a quantity of the product 16 computed by a quantity computation unit 124.

In this configuration, information such as a stock amount of each product 16 in a stockroom, a quantity of a stock amount that needs to be ordered, and an order quantity is stored in advance as stock information 354 in a storage apparatus 110. Then, the order processing unit 140 decides, from the computed quantity of the product 16, whether an order of the product 16 is necessary by referring to the stock information 354, and computes an order amount when it is decided that the order is necessary. The order processing by the order processing unit 140 may be automatically performed. Alternatively, the order processing unit 140 may notify a user terminal 20 of a manager of an order content, receive, from the manager, an operation of an execution instruction of the order processing or a change operation of the order content, and perform the order processing.

According to this configuration, a stockout state can be notified, and, furthermore, the order processing of a product being out of stock can also be performed from a stock situation.

Further, setting and a change of a decision reference can also be optimized by using machine learning.

The invention of the present application is described above with reference to the example embodiments and the examples, but the invention of the present application is not limited to the example embodiments and the examples described above. Various modifications that can be understood by those skilled in the art can be made to the configuration and the details of the invention of the present application within the scope of the invention of the present application.

Note that, when information related to a user is acquired and used in the present invention, this is lawfully performed.

A part or the whole of the above-described example embodiment may also be described in supplementary notes below, which is not limited thereto.

1. A management apparatus, including:
   an area computation unit that acquires an area of a displayable region of a display shelf in which a product can be displayed, and computes an area ratio of an area of a non-display region of the display shelf in which the product detected from a captured image is not displayed to the area of the display shelf;
   a decision unit decides whether to make a notification according to the area ratio; and
   a notification unit that makes the notification when it is decided that the notification is to be made.

2. The management apparatus according to supplementary note 1, further including
   a position determination unit that determines a position of the non-display region from the captured image, wherein
   the decision unit decides that the notification is to be made when the area ratio satisfies a reference for making the notification, and the position of the non-display region also satisfies a reference.

3. The management apparatus according to supplementary note 1 or 2, wherein
   the decision unit decides that the notification is to be made when the area ratio is equal to or more than a threshold value.

4. The management apparatus according to supplementary note 3, wherein
   the decision unit changes, according to a time period, the threshold value for the display shelf in a predetermined position, and decides whether to make the notification.

5. The management apparatus according to any one of supplementary notes 1 to 4, further including
   a position determination unit that determines a position of the non-display region from the captured image, wherein
   the decision unit decides that the notification is to be made unconditionally, based on the position of the non-display region, when the product is not displayed in a specific position of the display shelf.

6. The management apparatus according to any one of supplementary notes 1 to 5, further including:
   a position determination unit that determines a position of the non-display region from the captured image;
   a product determination unit that determines a product displayed in the non-display region of the display shelf, based on the position of the non-display region in the display shelf; and
   a display processing unit that displays character information and an image related to the determined product.

7. The management apparatus according to any one of supplementary notes 1 to 6, further including:
   a position determination unit that determines a position of the non-display region from the captured image;
   a product determination unit that determines a product displayed in the non-display region of the display shelf, based on the position of the non-display region in the display shelf; and
   a quantity computation unit that computes a quantity of the determined product, based on the area of the non-display region.

8. A management method, including:
   by a management apparatus,
   acquiring an area of a displayable region of a display shelf in which a product can be displayed;
   computing an area ratio of an area of a non-display region of the display shelf in which the product detected from a captured image is not displayed to the area of the display shelf;
   deciding whether to make a notification according to the area ratio; and
   making the notification when it is decided that the notification is to be made.

9. The management method according to supplementary note 8, further including:
   by the management apparatus,
   determining a position of the non-display region from the captured image; and
   deciding that the notification is to be made when the area ratio satisfies a reference for making the notification, and the position of the non-display region also satisfies a reference.

10. The management method according to supplementary note 8 or 9, further including,
    by the management apparatus,
    deciding that the notification is to be made when the area ratio is equal to or more than a threshold value.

11. The management method according to supplementary note 10, further including,
    by the management apparatus, changing, according to a time period, the threshold value for the display shelf in a predetermined position, and deciding whether to make the notification.

12. The management method according to any one of supplementary notes 8 to 11, further including:
by the management apparatus,
determining a position of the non-display region from the captured image; and
deciding that the notification is to be made unconditionally, based on the position of the non-display region, when the product is not displayed in a specific position of the display shelf.

13. The management method according to any one of supplementary notes 8 to 12, further including:
by the management apparatus,
determining a position of the non-display region from the captured image;
determining a product displayed in the non-display region of the display shelf, based on the position of the non-display region in the display shelf; and
displaying character information and an image related to the determined product.

14. The management method according to any one of supplementary notes 8 to 13, further including:
by the management apparatus,
determining a position of the non-display region from the captured image;
determining a product displayed in the non-display region of the display shelf, based on the position of the non-display region in the display shelf; and
computing a quantity of the determined product, based on the area of the non-display region.

15. A program for causing a computer to execute:
a procedure of acquiring an area of a displayable region of a display shelf in which a product can be displayed;
a procedure of computing an area ratio of an area of a non-display region of the display shelf in which the product detected from a captured image is not displayed to the area of the display shelf;
a procedure of deciding whether to make a notification according to the area ratio; and
a procedure of making the notification when it is decided that the notification is to be made.

16. The program according to supplementary note 15 for further causing a computer to execute:
a procedure of determining a position of the non-display region from the captured image; and
a procedure of deciding that the notification is to be made when the area ratio satisfies a reference for making the notification, and the position of the non-display region also satisfies a reference.

17. The program according to supplementary note 15 or 16 for further causing a computer to execute:
a procedure of deciding that the notification is to be made when the area ratio is equal to or more than a threshold value.

18. The program according to supplementary note 17 for further causing a computer to execute
a procedure of changing, according to a time period, the threshold value for the display shelf in a predetermined position, and deciding whether to make the notification.

19. The program according to any one of supplementary notes 15 to 18 for further causing a computer to execute:
a procedure of determining a position of the non-display region from the captured image; and
a procedure of deciding that the notification is to be made unconditionally, based on the position of the non-display region, when the product is not displayed in a specific position of the display shelf.

20. The program according to any one of supplementary notes 15 to 19 for further causing a computer to execute:
a procedure of determining a position of the non-display region from the captured image;
a procedure of determining a product displayed in the non-display region of the display shelf, based on the position of the non-display region in the display shelf; and
a procedure of displaying character information and an image related to the determined product.

21. The program according to any one of supplementary notes 15 to 20 for further causing a computer to execute:
a procedure of determining a position of the non-display region from the captured image;
a procedure of determining a product displayed in the non-display region of the display shelf, based on the position of the non-display region in the display shelf; and
a procedure of computing a quantity of the determined product, based on the area of the non-display region.

REFERENCE SIGNS LIST

1 Store system
3 Communication network
5 Camera
10 Display shelf
12 Outer frame
14 Shelf
16 Product
20 User terminal
30 Image processing apparatus
100 Management apparatus
102 Area computation unit
104 Decision unit
106 Notification unit
110 Storage apparatus
120 Position determination unit
122 Product determination unit
124 Quantity computation unit
130 Display processing unit
132 Display apparatus
140 Order processing unit
200, 210, 212, 230, 240 Image information
302 Shelf area information
310 Notification reference information
320 Display state information
330 Notification region reference information
332 Notification priority order information
340 Notification reference setting information
350 Product display information
352 Product information
354 Stock information
400 Notification screen
402 Shelf list tab
410 Notification list tab
412 Thumbnail image
414 Notification content display portion
416 Notification date and time display portion
420 Detailed content screen
422 Notification date and time display portion
424 Shelf image display portion
426 Confirmation button
428 Button
500 Shelf image region 1000 Computer
1010 Bus
1020 Processor
1030 Memory
1040 Storage device
1050 Input/output interface
1060 Network interface

What is claimed is:

1. A management apparatus comprising:
at least one memory storing instructions; and
at least one processor configured to execute the instructions to:
receive a captured image of a display shelf including a displayable region in which products are to be displayed;
detect the products in the displayable region;
determine, in the displayable region of the display shelf, a non-display region of the display shelf in which no products have been detected, a plurality of shapes of notification target region in the displayable region being stored with a priority order;
determine a shape of the non-display region;
compare the shape of the non-display region to shapes of a plurality of notification target regions in order of priority of the notification target regions until a matching notification target region is identified for which the shape has a degree of coincidence with the shape of the non-display region greater than a predetermined threshold,
wherein once the matching notification target region is identified, comparison of the shape of the non-display region to the shapes of other of the notification target regions that are lower in priority than the matching notification target region is bypassed; and
output a notification when the matching notification target region has been identified.

2. The management apparatus according to claim 1, wherein the at least one processor is further configured to execute the instructions to:
determine a position of the non-display region from the captured image; and
in a case where no products are displayed in a specific position of the display shelf, as determined based on the position of the non-display region, do not perform comparison of the shape of the non-display region to the shapes of the plurality of notification target regions, and output the notification.

3. The management apparatus according to claim 1, wherein the at least one processor is further configured to execute the instructions to:
determine a position of the non-display region from the captured image;
determine a product displayed in the non-display region of the display shelf, based on the position of the non-display region in the display shelf; and
display character information and an image related to the determined product displayed in the non-display region.

4. The management apparatus according to claim 1, wherein the at least one processor is further configured to execute the instructions to:
determine a position of the non-display region from the captured image;
determine a product displayed in the non-display region of the display shelf, based on the position of the non-display region in the display shelf; and
compute a quantity of the determined product displayed in the non-display region, based on an area of the non-display region.

5. The management apparatus according to claim 1, wherein the at least one processor is further configured to execute the instructions to:
as the priority order is higher, perform comparison of the shape of the non-display region to the shapes of the plurality of notification target regions in a shorter processing cycle or set a level of the notification higher; and
perform the notification according to a different notification method depending on the level of the notification.

6. A management method performed by a management apparatus and comprising:
receiving a captured image of a display shelf including a displayable region in which products are to be displayed;
detecting the products in the displayable region;
determining, in the displayable region of the display shelf, a non-display region of the display shelf in which no products have been detected, a plurality of shapes of notification target region in the displayable region being stored with a priority order;
determining a shape of the non-display region;
comparing the shape of the non-display region to shapes of a plurality of notification target regions in order of priority of the notification target regions until a matching notification target region is identified for which the shape has a degree of coincidence with the shape of the non-display region greater than a predetermined threshold,
wherein once the matching notification target region is identified, comparison of the shape of the non-display region to the shapes of other of the notification target regions that are lower in priority than the matching notification target region is bypassed; and
outputting a notification when the matching notification target region has been identified.

7. The management method according to claim 6, further comprising:
determining a position of the non-display region from the captured image; and
in a case where no products are displayed in a specific position of the display shelf, as determined based on the position of the non-display region, not performing comparison of the shape of the non-display region to the shapes of the plurality of notification target regions, and output the notification.

8. The management method according to claim 6, further comprising:
determining a position of the non-display region from the captured image;
determining a product displayed in the non-display region of the display shelf, based on the position of the non-display region in the display shelf; and
displaying character information and an image related to the determined product displayed in the non-display region.

9. The management method according to claim 6, further comprising:
determining a position of the non-display region from the captured image;
determining a product displayed in the non-display region of the display shelf, based on the position of the non-display region in the display shelf; and computing a quantity of the determined product displayed in the non-display region, based on an area of the non-display region.

10. The management method according to claim 6, further comprising:

as the priority order is higher, performing comparison of the shape of the non-display region to the shapes of the plurality of notification target regions in a shorter processing cycle or setting a level of the notification higher; and performing the notification according to a different notification method depending on the level of the notification.

11. A non-transitory computer-readable storage medium storing a program for executable by a computer to perform processing comprising:

receiving a captured image of a display shelf including a displayable region in which products are to be displayed;

detecting the products in the displayable region;

determining, in the displayable region of the display shelf, a non-display region of the display shelf in which no products have been detected, a plurality of shapes of notification target region in the displayable region being stored with a priority order;

determining a shape of the non-display region;

comparing the shape of the non-display region to shapes of a plurality of notification target regions in order of priority of the notification target regions until a matching notification target region is identified for which the shape has a degree of coincidence with the shape of the non-display region greater than a predetermined threshold, wherein once the matching notification target region is identified, comparison of the shape of the non-display region to the shapes of other of the notification target regions that are lower in priority than the matching notification target region is bypassed; and outputting a notification when the matching notification target region has been identified.

12. The non-transitory computer-readable storage medium according to claim 11, wherein the processing further comprises:

determining a position of the non-display region from the captured image; and in a case where no products are displayed in a specific position of the display shelf, as determined based on the position of the non-display region, not performing comparison of the shape of the non-display region to the shapes of the plurality of notification target regions, and output the notification.

13. The non-transitory computer-readable storage medium according to claim 11, wherein the processing further comprises:

determining a position of the non-display region from the captured image;

determining a product displayed in the non-display region of the display shelf, based on the position of the non-display region in the display shelf; and displaying character information and an image related to the determined product displayed in the non-display region.

14. The non-transitory computer-readable storage medium according to claim 11, wherein the processing further comprises:

as the priority order is higher, performing comparison of the shape of the non-display region to the shapes of the plurality of notification target regions in a shorter processing cycle or setting a level of the notification higher; and performing the notification according to a different notification method depending on the level of the notification.

* * * * *